United States Patent
Kunz

(10) Patent No.: US 7,614,675 B2
(45) Date of Patent: Nov. 10, 2009

(54) INTEGRATED SLIDE-OUT DRIVE SYSTEM

(75) Inventor: James R. Kunz, Eugene, OR (US)

(73) Assignee: Actuant Corporation, Glendale, WI (US)

( * ) Notice: Subject to any disclaimer, the term of this patent is extended or adjusted under 35 U.S.C. 154(b) by 344 days.

(21) Appl. No.: 11/288,607

(22) Filed: Nov. 29, 2005

(65) Prior Publication Data

US 2006/0113822 A1  Jun. 1, 2006

Related U.S. Application Data

(60) Provisional application No. 60/631,404, filed on Nov. 29, 2004.

(51) Int. Cl.
*B60P 3/39* (2006.01)
(52) U.S. Cl. ............... 296/26.01; 296/26.12; 296/26.13
(58) Field of Classification Search ... 296/26.01–26.03, 296/26.12, 26.13, 165, 171–173, 175, 176; 52/67
See application file for complete search history.

(56) References Cited

U.S. PATENT DOCUMENTS

| | | | | |
|---|---|---|---|---|
| 2,506,870 A | * | 5/1950 | Hairston | 296/175 |
| 2,842,972 A | * | 7/1958 | Houdart | 74/422 |
| 3,341,986 A | * | 9/1967 | Brosig | 52/67 |
| 3,482,716 A | * | 12/1969 | Leadley | 414/543 |
| 5,634,683 A | * | 6/1997 | Young | 296/165 |
| 5,758,918 A |   | 6/1998 | Schneider et al. | |
| 5,788,306 A | * | 8/1998 | DiBiagio et al. | 296/26.02 |
| 5,791,715 A | * | 8/1998 | Nebel | 296/26.13 |
| 6,116,671 A | * | 9/2000 | Schneider | 296/26.01 |
| 6,234,566 B1 | * | 5/2001 | Cyr et al. | 296/171 |
| 6,402,216 B1 | * | 6/2002 | McManus et al. | 296/26.14 |
| 6,471,275 B1 |   | 10/2002 | Kunz et al. | |
| 6,601,896 B1 | * | 8/2003 | Nye et al. | 296/26.13 |
| 6,619,714 B2 | * | 9/2003 | Schneider et al. | 296/26.13 |
| 6,623,066 B2 | * | 9/2003 | Garceau et al. | 296/165 |
| 6,637,794 B2 | * | 10/2003 | McManus et al. | 296/26.01 |
| 6,644,719 B2 | * | 11/2003 | Young, Sr. | 296/165 |
| 6,681,531 B2 |   | 1/2004 | McManus | |
| 6,796,590 B2 |   | 9/2004 | Schneider | |
| 6,871,897 B1 | * | 3/2005 | Snyder | 296/26.13 |
| 7,004,528 B2 |   | 2/2006 | Nye et al. | |
| 7,066,528 B1 | * | 6/2006 | Crean | 296/175 |
| 7,073,844 B2 | * | 7/2006 | Garceau et al. | 296/165 |
| 7,150,482 B1 | * | 12/2006 | Blodgett | 296/26.13 |
| 7,150,483 B2 | * | 12/2006 | Rasmussen | 296/26.14 |
| 7,229,123 B2 | * | 6/2007 | Kunz | 296/175 |
| 7,234,747 B2 | * | 6/2007 | Rasmussen | 296/26.01 |
| 7,237,818 B2 | * | 7/2007 | Crean et al. | 296/26.13 |

* cited by examiner

*Primary Examiner*—Glenn Dayoan
*Assistant Examiner*—Gregory Blankenship
(74) *Attorney, Agent, or Firm*—Quarles & Brady LLP

(57) ABSTRACT

An expandable vehicle has slide-out sections in which one or more cog tracks are driven by a modular cog wheel drive assembly to move the slide-out sections in and out. The cog tracks can be integrated into the structure of the slide-out sections, and the slide-out sections are supported against tipping down both upon extension and retraction by a cable system that exerts a counter-moment on them in both directions.

21 Claims, 12 Drawing Sheets

INTEGRATED SLIDE-OUT DRIVE SYSTEM

CROSS-REFERENCE TO RELATED APPLICATION

This application claims priority to U.S. Provisional Patent Application Ser. No. 60/631,404 filed Nov. 29, 2004.

STATEMENT CONCERNING FEDERALLY SPONSORED RESEARCH OR DEVELOPMENT

Not applicable.

FIELD OF THE INVENTION

This invention relates to slide-out sections of expandable vehicles, and more particularly to a drive system for extending and retracting slide-out rooms and drawers in recreational vehicles.

BACKGROUND OF THE INVENTION

Because recreational vehicles are mobile vehicles, the width of the vehicle, and therefore of the interior space, is limited by size restrictions associated with public roads. It is, however, highly desirable to provide additional living and storage space when the vehicle is parked. Accordingly, it is common to include both slide-out rooms and drawers which can be retracted into the interior of the vehicle when the vehicle is traveling, but which can be extended from the interior to provide additional space when the unit is parked for use and when it is desirable to retrieve items from storage.

Typically, slide-out rooms are extended from and retracted through an aperture in one of the side walls of the vehicle using a pair of support rails that telescopically extend and retract through a corresponding pair of channels. The support rails are attached to the slide-out room and the channels are attached to the fixed portion of the vehicle, such that the slide-out room retracts and extends with the retraction and extension of the support rail. The support rails may be driven hydraulically, pneumatically, electrically or using various combinations of these systems. The drive systems can include, for example, a mechanism such as an electric motor driving a pinion gear, cables, chains, one or more hydraulic cylinders or a lead screw.

These systems, therefore, are mechanically very complicated, and can be difficult and expensive to repair. In addition, these systems are typically fairly heavy, adding significantly to the weight of the vehicle to which they were assembled, thereby decreasing the efficiency of the vehicle, and limiting the ability of the vehicle to maneuver in rough terrain.

SUMMARY OF THE INVENTION

The present invention provides an integrated slide-out drive system that adds minimally to the weight of the vehicle and is adaptable to many types of expansion sections including rooms, drawers, slide-out, pivot-out, etc.

In the present invention, a cog track is provided, which can be molded from a material such as glass-filled nylon, and can form a structural component of the room or drawer to which it is applied. The cog track is assembled to the expansion section and is driven by a cog drive, which is also an integrated or modular assembled component in which a cog wheel that meshes with the cog track is driven by a motor. The cog track is typically assembled to the expansion section, at the lower wall or lower edge of the section.

To keep the expansion section from tipping down once its center of gravity passes the threshold on the way out, a cable is provided that exerts a counter-moment on the section. The cable extends from an upper and outer portion of the section to a pair of pulleys, one toward the top of the stationary vehicle wall and one lower, and the other end of the cable is attached to an inner lower portion of the section. For wide sections, there are preferably two counter-moment cables provided, one on each end of the section, and there would probably be provided at least two cog tracks, one at each end of the unit or near each end, driven by two cog drive units, and the cog drive units could be synchronized electronically. Alternatively, a synchronizing shaft could be provided between the two cog drive units, and only one cog drive unit to drive two cog wheels, or another synchronizing mechanism could be provided such as synchronizing cables, synchronizing cylinders, or any other system of synchronizing.

In one aspect, the present invention provides a cog wheel drive for a slide-out section of a vehicle comprising a cog track having a base, side walls and teeth on the base between the sidewalls in meshing engagement with a cog wheel.

The cog track can be affixed at bottom edges of sidewalls of the slide-out section, and the cog wheel can be journalled to a bracket on which a drive motor that drives the cog wheel is also mounted. The cog wheel drive can also include a cable having both ends affixed to the slide-out section and entrained about pulleys so as to exert a moment on the slide-out section that counteracts a gravity induced moment that tends to tip the slide-out section down. For driving more than one cog track, the motor can include a shaft coupled to the cog wheel at a first end and to a second cog wheel for driving a second cog rack at the opposing end to synchronize motion of the cog wheel and the second cog wheel.

In another aspect of the invention, an expansion section for a recreational vehicle is provided including a structure having a bottom surface and sized and dimensioned to be movable through an opening in a wall of the recreational vehicle. A cog track is affixed to the bottom surface of the structure and includes a base, side walls and teeth on the base between the sidewalls. A cog wheel is provided having teeth in meshing engagement with the teeth in the cog track, and a motor is coupled to the cog wheel, such that the motor can drive the cog wheel to extend or retract the structure from the recreational vehicle.

The expansion section can also include a second cog track coupled to the bottom surface of the structure, and a second cog wheel having teeth in meshing engagement with the teeth in the second cog track. The second cog wheel can coupled to the shaft of the motor to synchronize motion of the first and second cog wheels.

The structure can also include at least one side wall, and the cog track can be coupled to a bottom surface of the sidewall. The cog track can also comprise a plurality of sections that are coupled together, and these sections can include ramped sections.

In another aspect of the invention, a recreational vehicle is provided including a floor, and an exterior wall defining an interior space. The exterior wall is provided adjacent the floor and includes an opening for receiving a slide out section having a cog track coupled to the bottom surface. The cog track includes teeth in meshing engagement with teeth in a cog wheel coupled to the recreational vehicle. A drive motor is coupled to the cog wheel for driving the slide-out section between a stored position inside the recreational vehicle and an extended position extending through the opening in the recreational vehicle.

The cog track in the slide out section can include a ramped section, the ramped section positioning the bottom surface of the slide-out section substantially parallel to the floor of the recreational vehicle when the slide-out section is extended. The cog track can be constructed of a plurality of cog track sections, that are selectively coupled together to provide a cog track of a selected length.

An opening can also be provided in an exterior wall of the slide-out section, and the recreational vehicle can also include a second slide-out section sized and dimensioned to be extended and retracted through the opening in the slide-out section.

A notch can be formed in the edge of the floor of the recreational vehicle, and the cog wheel can be coupled adjacent the notch and extending through the notch.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
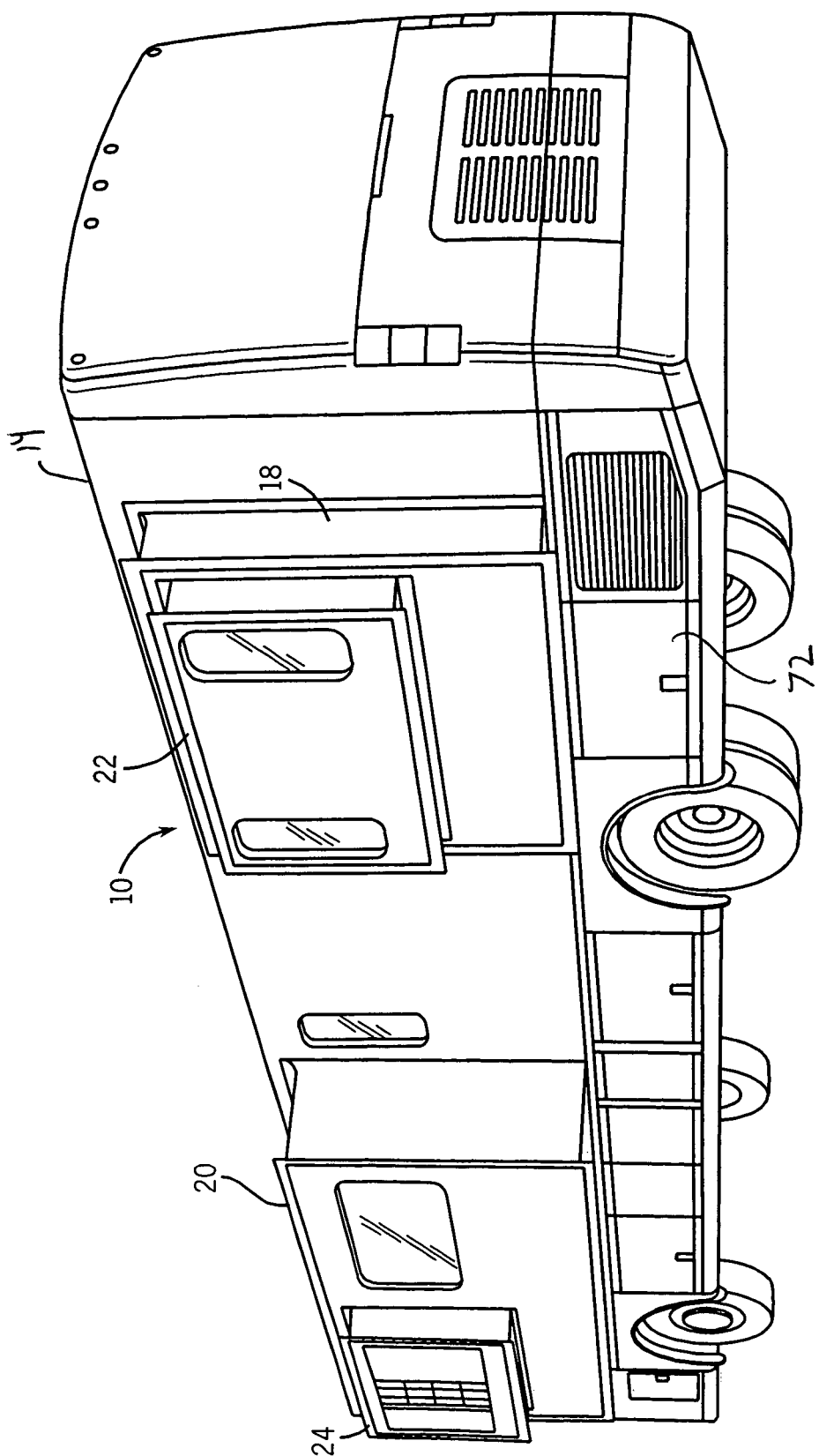
FIG. 1 is an exterior perspective view of a recreational vehicle constructed in accordance with the present inventor.
Figure 2:
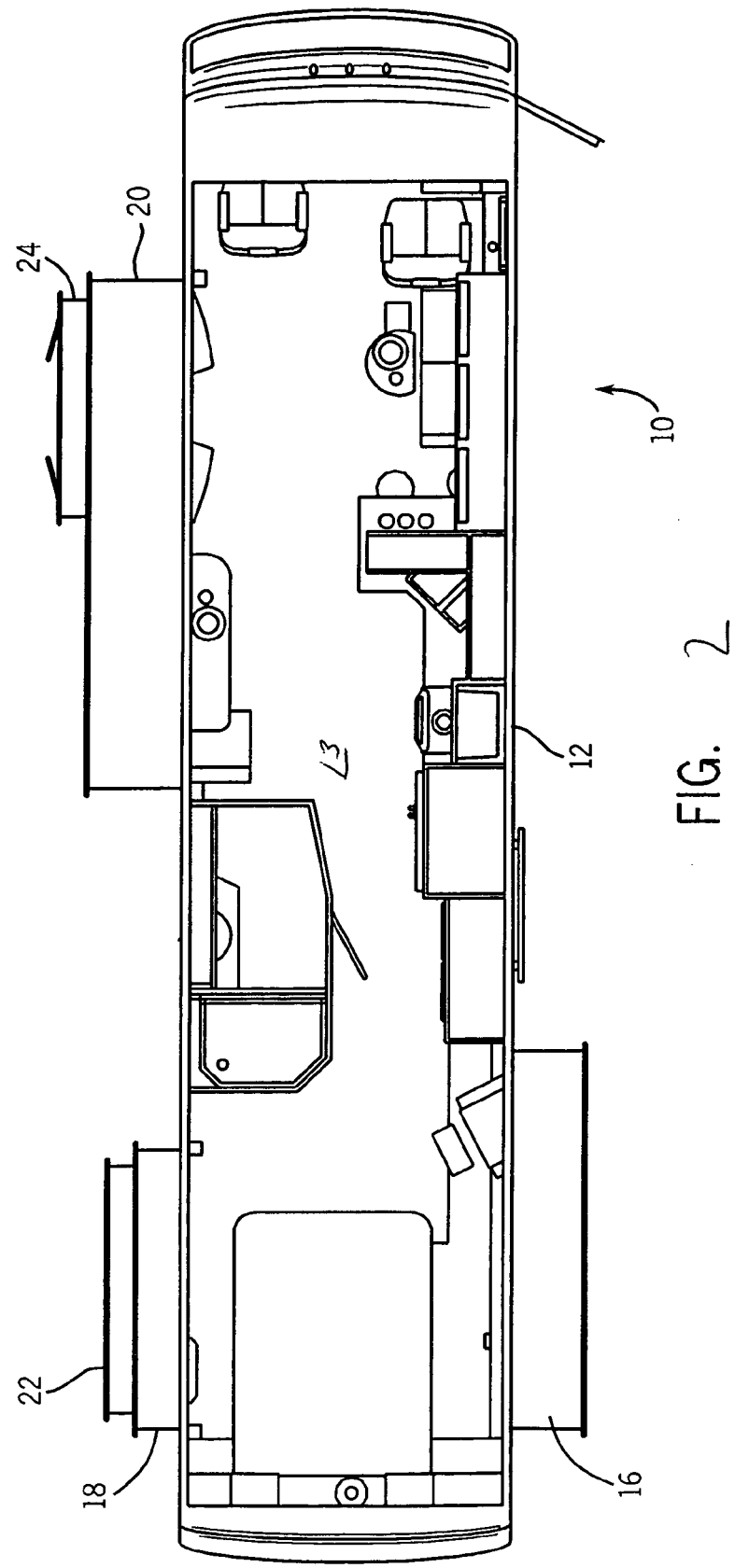
FIG. 2 is a floor plan view of a recreational vehicle having a number of slide-out room sections including slide-in-slide sections and slide-out sections, with all of the sections extended.

Referring now to the Figures, and more particularly to FIGS. 1 and 2, a recreational vehicle 10 constructed in accordance with the present invention is shown. The recreational vehicle 10 includes exterior walls 12 surrounding a floor 13 covered by a vehicle roof 14 to define a vehicle interior 21. To provide additional space for the vehicle interior 21, slide out rooms 16, 18, and 20 which can provide, for example, a bedroom, a living room, and a vanity portion of a bathroom, extend from the sides 12 of the vehicle 10. Additionally, slide-in-slide sections 22 and 24 which provide, for example, bay windows extending from the slide out rooms 18 and 20, respectively, can also be provided. To provide additional storage, slide-out drawers 72 can also be provided in the side of the vehicle 10 under the floor 13, as described more fully below.

Figure 3:
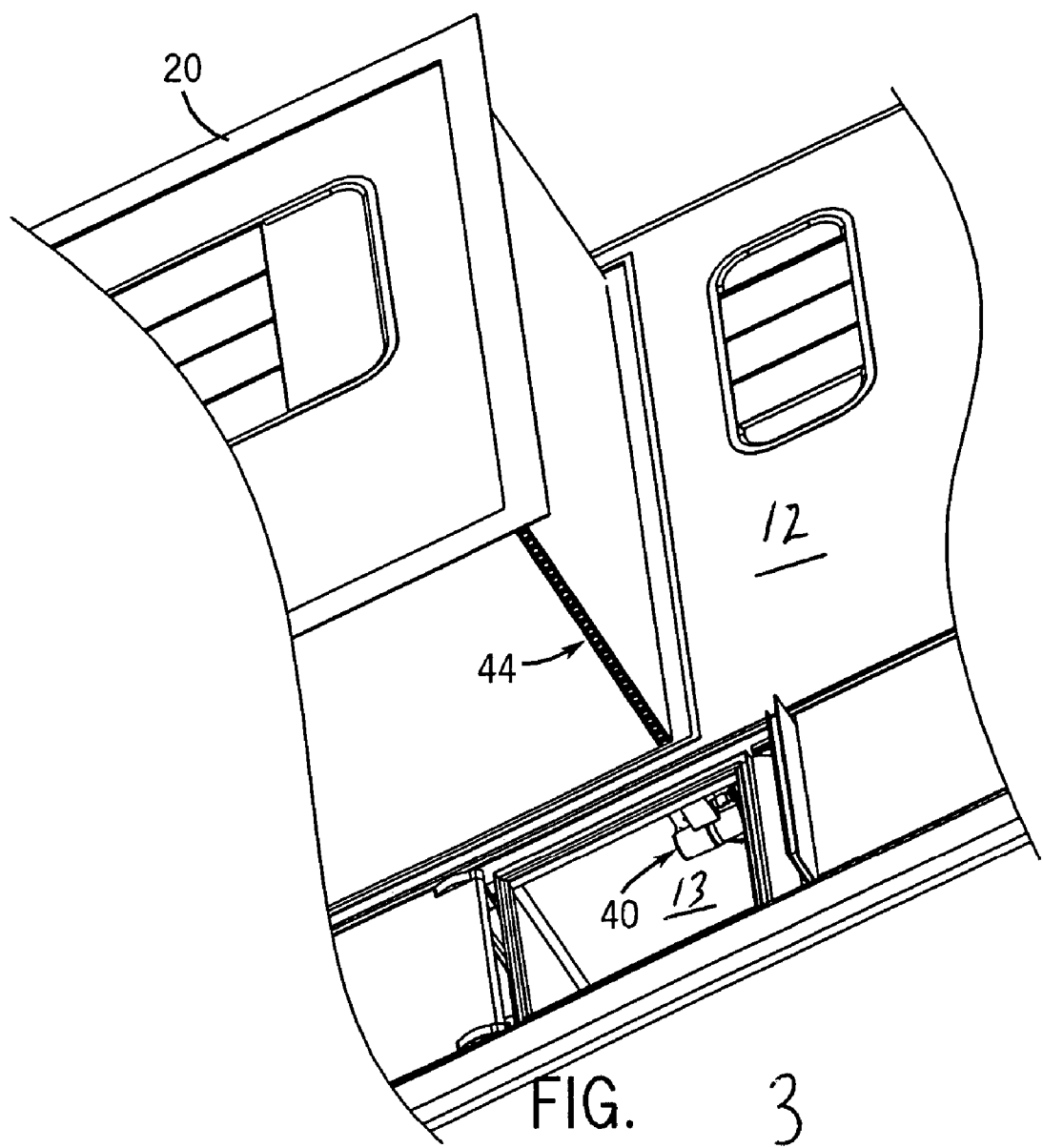
FIG. 3 illustrates a cog track and cog wheel drive unit with the room extended and lowered so as to provide a flush floor with the stationary floor of the recreational vehicle.
Figure 4:
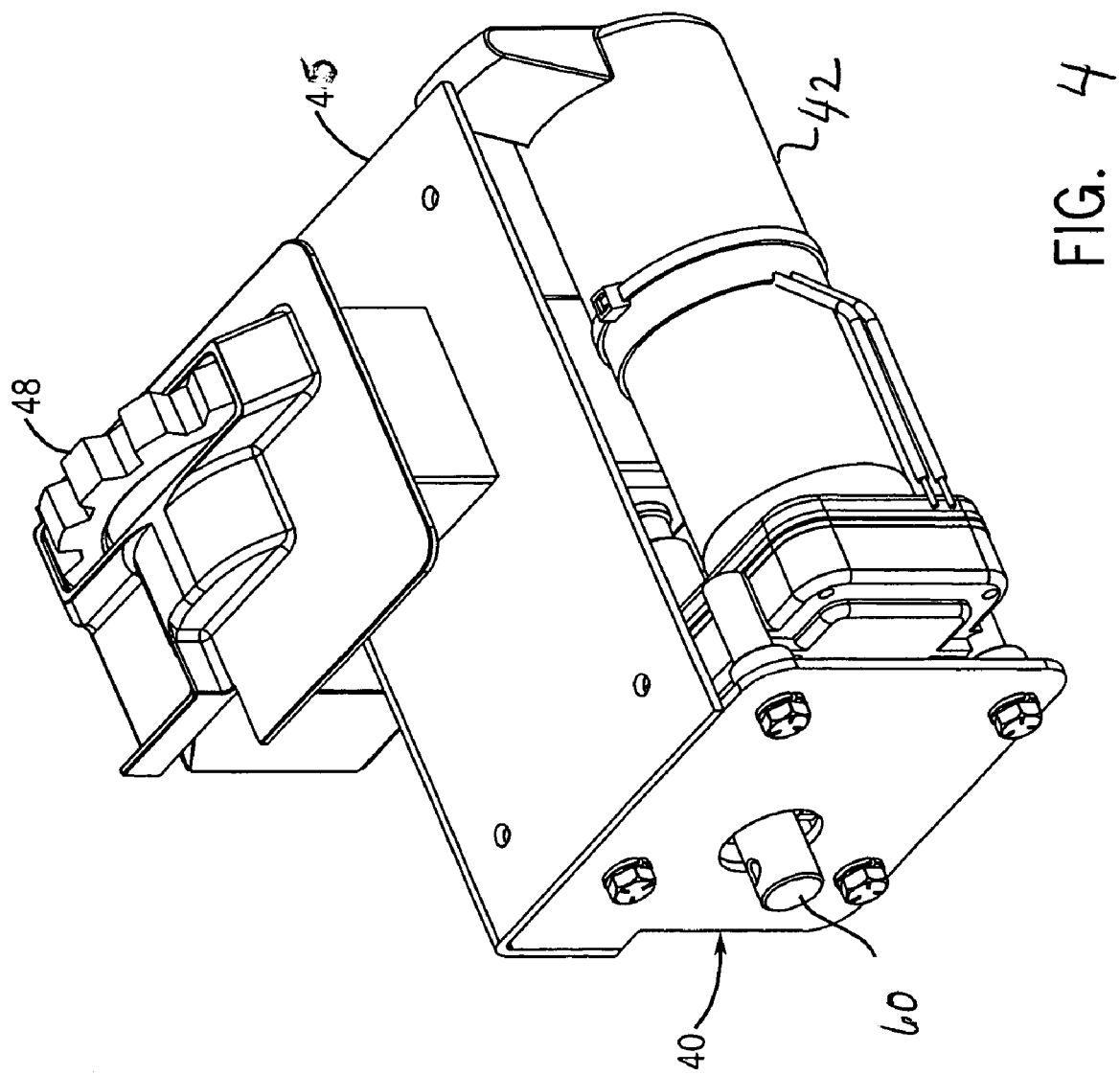
FIG. 4 is perspective view of a modular cog wheel drive unit illustrating a cog gear of the unit and a drive motor attached to a common bracket.
Figure 5:
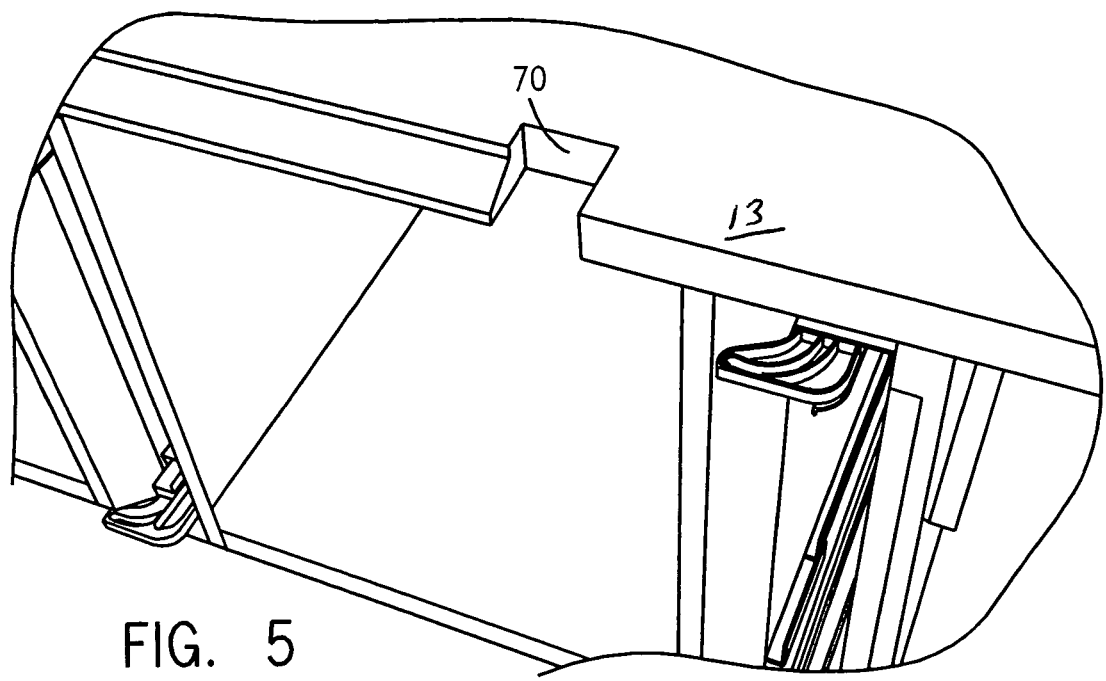
FIG. 5 is a view showing a small notch in the edge of the floor which is created to accommodate the cog drive gear that extends up through the floor to engage the cog track.
Figure 15:
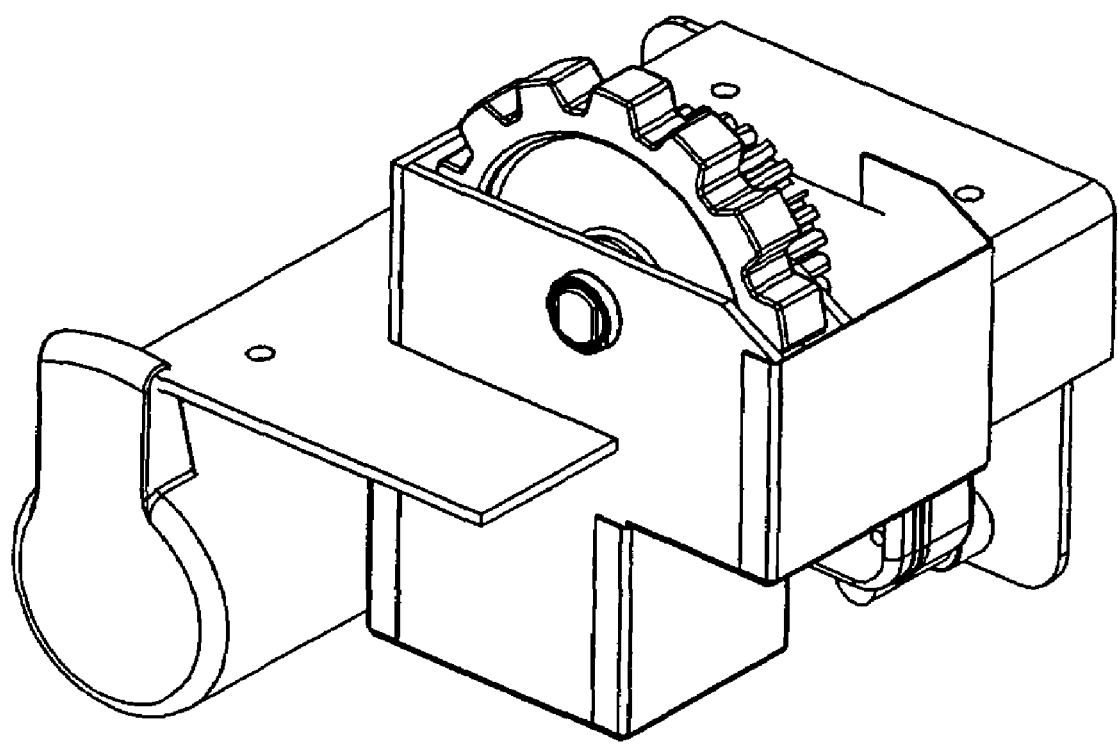
FIG. 15 is a perspective view of another embodiment of a cog drive unit (for use in the application of FIG. 5) having the motor and cog wheel integrated into a single unit.

Referring now to FIGS. 3 and 4, a cog drive system is shown for use in driving the slide-out rooms 16, 18, and 20, and slide-in-slide sections 22 and 24 into and out of the walls 12. Referring first to FIG. 3, the cog drive system includes a modular cog drive unit 40 mounted beneath the floor 13 of the recreation vehicle 10 and coupled to track 44 provided on a bottom surface of the associated slide out room or slide-in-slide section. Referring now specifically to FIG. 4, the modular cog drive unit 40 comprises a motor gear unit 42 mounted to a bracket 45 that drives a shaft 60. The shaft 60 drives gears (not shown), that in turn drive a cog wheel 48, having teeth 49 sized and dimensioned to mesh with teeth provided in the track 44 described below. The motor 42 preferably includes an electric brake that automatically engages when the power to the motor 42 is turned off and that may be manually released or disengaged (e.g., by a lever) in case power to the motor 42 fails. Referring now to FIG. 5, a small notch 70 can be cut in the edge of the floor 13 of the vehicle 10 to accommodate the cog wheel drive 40, and a drive 40 including a bracket specifically for this configuration (FIG. 15) can be used. Alternatively, as, for example, when the slide-out room is a bedroom (16, FIG. 1) including a bed on a pedestal, the drive units that would mesh with the tracks 44 of room 16 could be inside the pedestal, under the bed, and in meshing engagement with the tracks 44.

Figure 6:
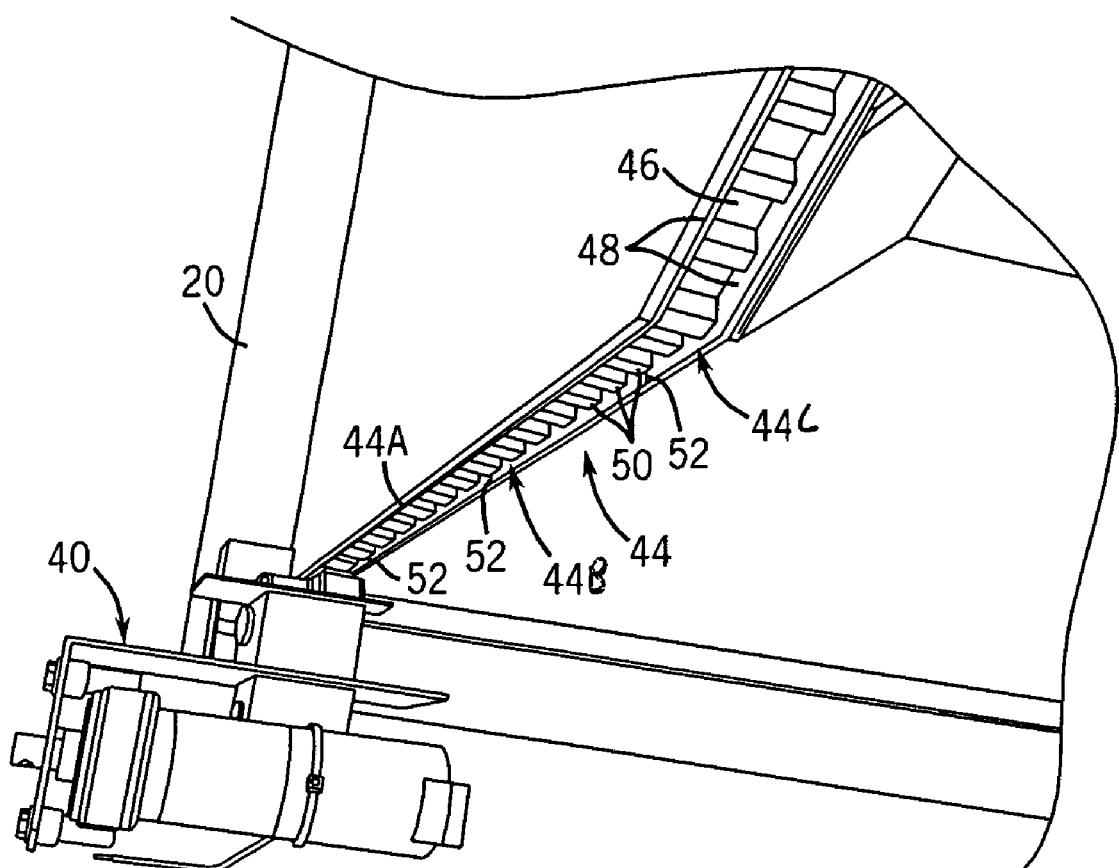
FIG. 6 is bottom perspective view illustrating how the cog drive unit meshes with a cog track that is integrated into the lower edge of a side wall of a slide-out section.
Figure 7:
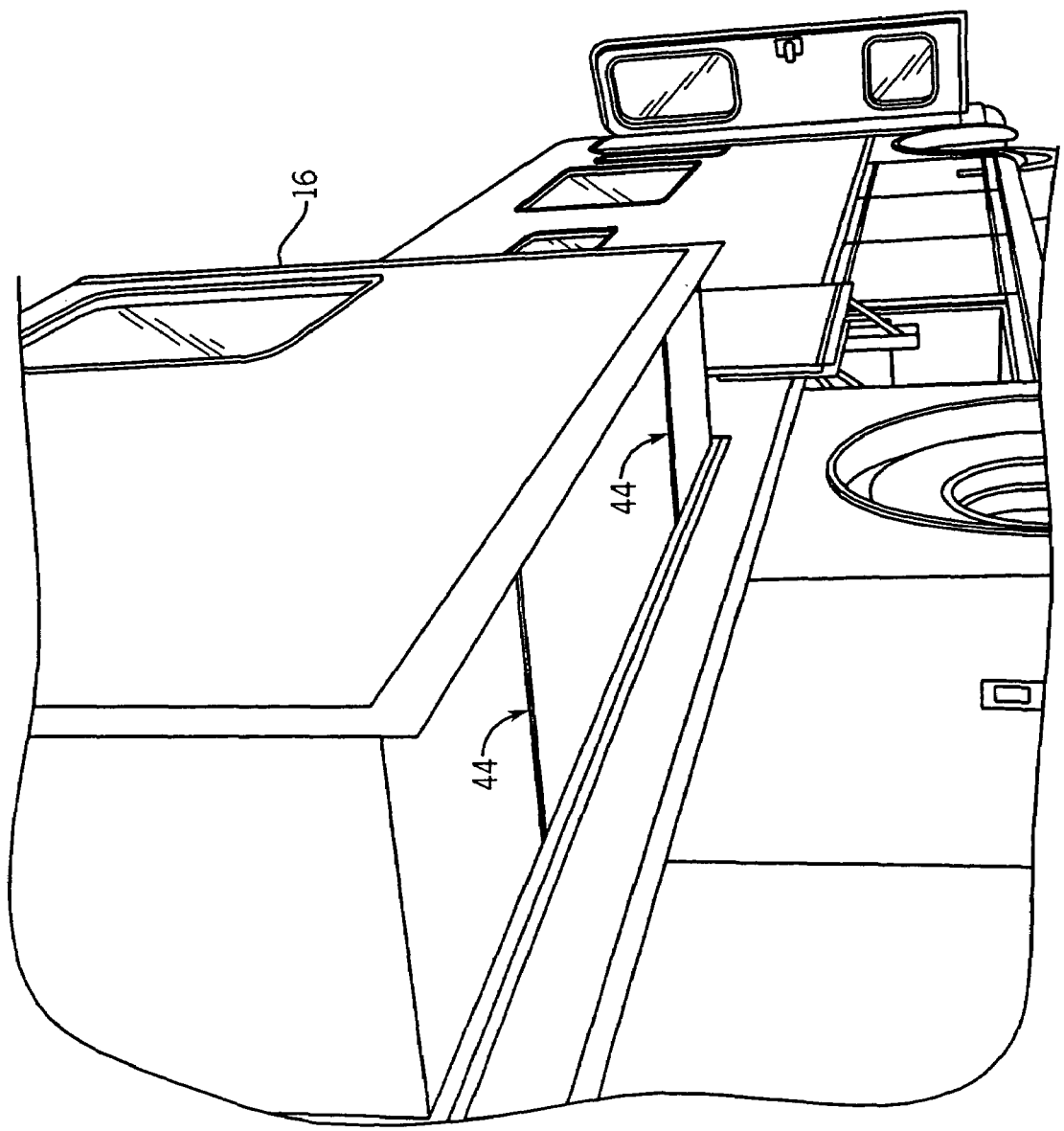
FIG. 7 is another exterior perspective view from the other side of the recreational vehicle of FIG. 1.

Referring now to FIG. 6, a section of cog track 44 provided under slide-out room 20 (FIG. 1) is shown. The cog track 44 includes a base wall 46, spaced side walls 48, and teeth 50 supported by the base wall 46 and by the side walls 48. The track 44, as described above, can be integrated into a bottom surface of a slide out room. As shown in FIG. 6, the track 44 is preferably received in a channel at the lower edge of the side wall 58 of the slide-out unit 20, which is advantageous because it preserves space. Referring now to FIG. 7, the tracks 44 can also be provided on the bottom side of the floor 57 of the room 20, and spaced inward from the side walls 58. The track 44 and cog wheel 48 can be constructed of a number of materials, but are preferably constructed of a material such as glass-filled nylon. Alternatively, the track 44 and cog wheel 48 can be cast of a suitable metal or other material.

Referring again to FIG. 6, the track 44 can be made in sections 44A, 44B, 44C that mate from end to end through joints 52. Therefore, several sections of track 44A, 44B, 44C can be linked together while retaining the teeth 50 at the correct spacing from section to section, so as to obtain tracks 44 of varying lengths. In addition, sections of track 44, such as shown here with reference to section 44C, can be angled with respect to an adjacent section of track 44B, so that the track 44 includes a ramped surface. At the end of the extension stroke, the ramped surface lowers the slide out room 20 such that, for example, the floor section 57 of the room 20 is aligned with the floor 13 of the recreational vehicle 10 to provide a substantially flat surface. Because the structure of the cog rack 44 is formed of sections that interconnect with one another, that can be molded, and that can be shaped for particular applications, the resultant structure is very versatile, adds nominal weight to the vehicle and can be integrated at low cost. In addition, the large bearing surface areas of the cog wheel 48 and of the cog track 44 permit the cog wheel 48 to bear a portion of the weight of the slide-out room 20 without excessive wear.

Figure 8:
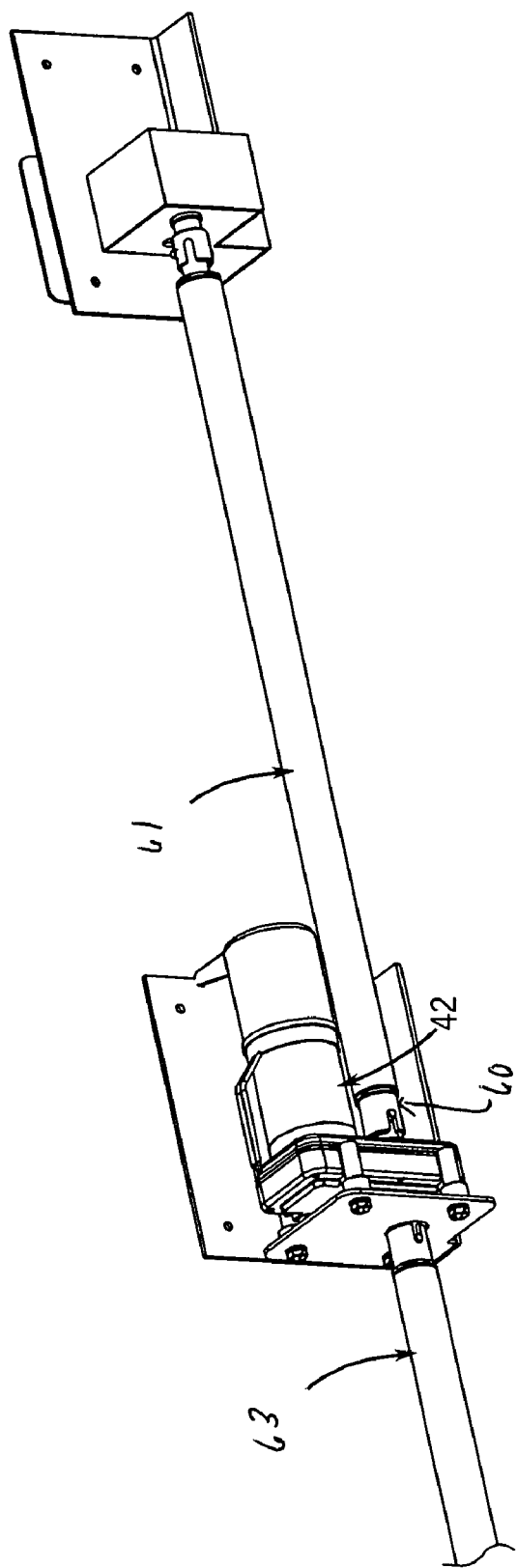
FIG. 8 is a view showing an alternative arrangement in which a motor gear train drive unit drives a shaft that is common to two cog wheel units that would be meshing with cog tracks above them.
Figure 9:
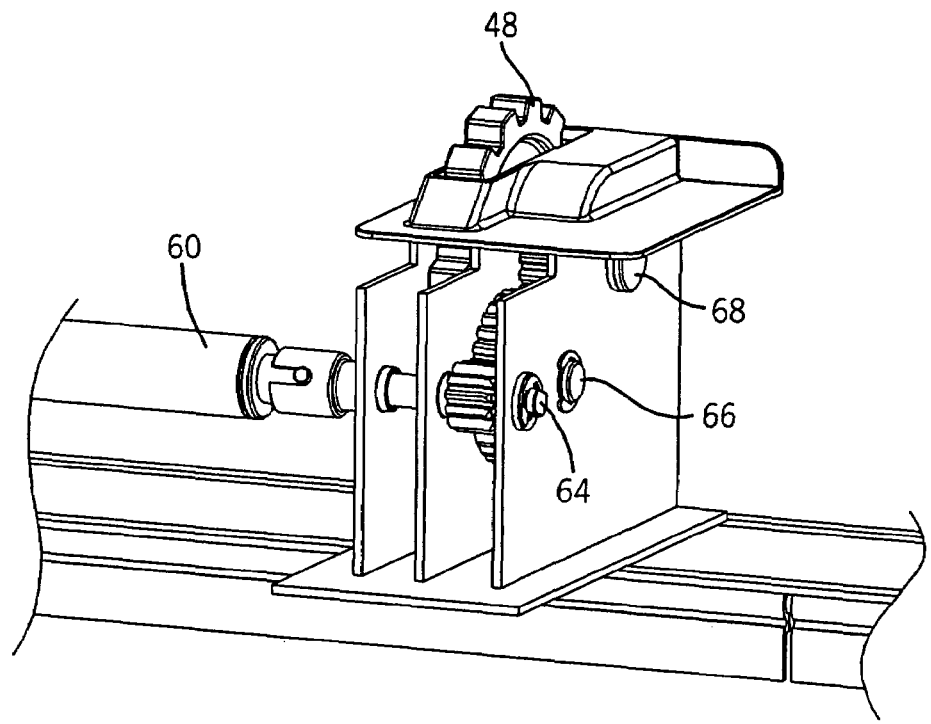
FIG. 9 is a view of the system of FIG. 8 illustrating one of the cog wheel drive units driven by the common shaft.

In applications where two cog wheel drives are provided when, for example, extending opposite sides of a large room, some means of synchronization must be provided from side to side so that the two sides of the room expand and retract at the same rate and together. This can be done electronically, for example, using the methods disclosed in U.S. Pat. No. 6,471,275. However, a mechanical method of synchronization may be used as illustrated in FIGS. 8 and 9. In the system of FIGS. 8 and 9, a centrally located motor 42 drives a common shaft 60 including shaft sections 61 and 63 extending from opposite sides of the motor 42. The shaft sections 61 and 63 are connected to the motor 42 at a first end, and to a cog wheel 48 at the opposing end. Appropriate gearing may also be provided at the end receiving the cop wheel. Referring specifically to FIG. 9, the shaft 60 drives a first pinion gear having its axis at 64, that gear driving a second gear having its axis at 66, and that gear driving a third gear having its axis at 68. The gear with its axis at 68 either is cast integrally with the cog wheel 48 or connected to the shaft that drives the cog wheel 48 or otherwise connected to the cog wheel 48 so they rotate together. A similar gear train is used to drive the cog wheel 48 in the integrated system illustrated in FIGS. 3 and 5. Although only one end is shown in FIGS. 8 and 9, it is understood that the cog wheel drive would be at both ends of the shaft 60, and would be driven through a gear train in the embodiment disclosed. Furthermore, although a specific synchronization method is described, it will be apparent that other synchronizing mechanisms could be used, including electronic means, synchronizing cables, synchronizing cylinders, or any other system of synchronizing.

Figure 10:
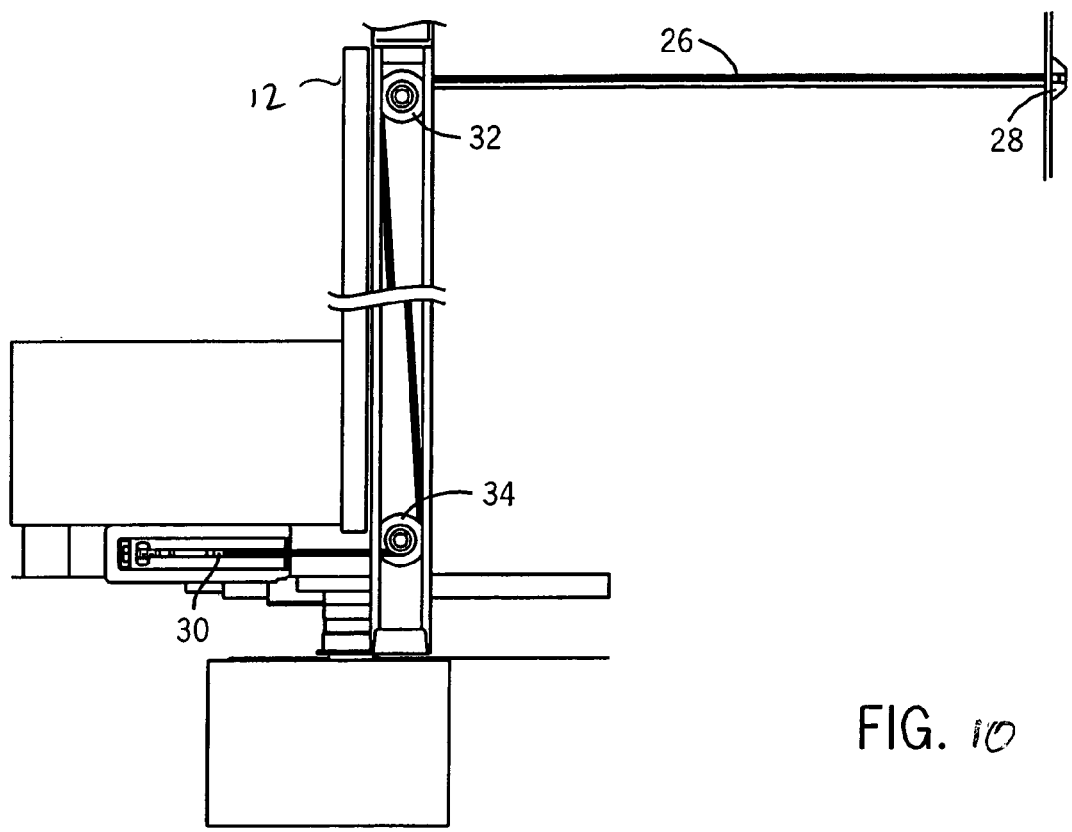
FIG. 10 is a side schematic view illustrating cable support of a slide-out room section.
Figure 11:
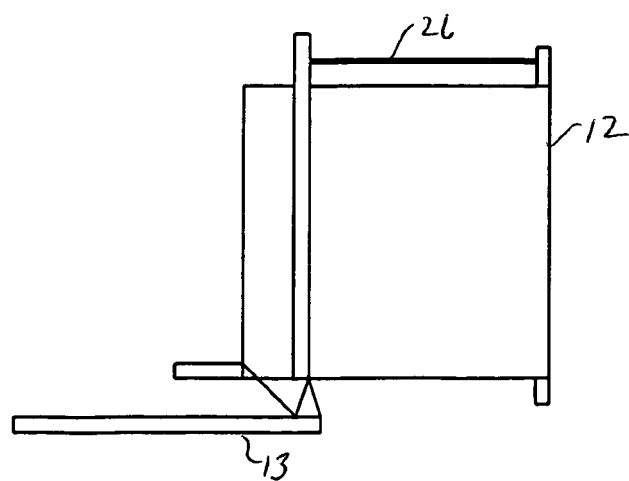
FIG. 11 is a schematic view illustrating how a slide-out, when extended, tends to tip down due to a gravity induced moment and how the cable of FIG. 10 is applied to resist such tipping.

Referring now to FIGS. 10-13, to prevent tipping or rotation of the slide out room as the room is extended and retracted, a cable support system including first and second cables 26 and 28 is also provided. Referring first to FIG. 10, the cable has one end fixed relatively high on a flange 28 of an exterior slide-out room wall 27. The opposing end is affixed relatively low to a portion of the slide-out room 20 that is in the interior 21 of the vehicle 10 at 30. Cable 26 is guided by an upper pulley 32 and a lower pulley 34, both of which have horizontal axes of rotation and are journalled to the stationary side wall 12 of the vehicle 10. The cable 26 prevents the slide-out room 20 from tipping down when its center of gravity passes beyond the edge of the interior floor 13 and through the side wall 12 of the vehicle 10 as shown in FIG. 11. As can be seen in FIG. 10, cable 26 exerts a force on the exterior room wall flange 28 which acts to the left and cable 26 exerts a force at its lower cable attachment point 30 that acts to the right. The combination of these two forces produces a moment on the slide-out room 20 that tends to turn it counter-clockwise. The force applied by cable 26 is opposite to the direction that the room 20 tends to tip when its center of gravity passes outside of the interior 21 of the vehicle 10 (FIG. 1) when it is being slid out from the vehicle 10.

Figure 12:
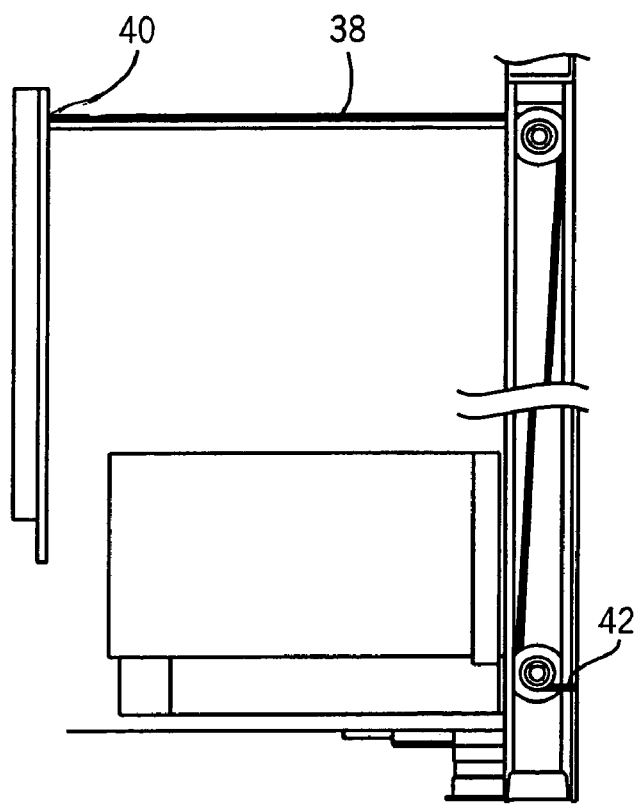
FIG. 12 is a view like FIG. 11 but with the room retracted and showing how another cable is applied to counteract the gravity induced moment acting on the room when it is retracted.
Figure 13:
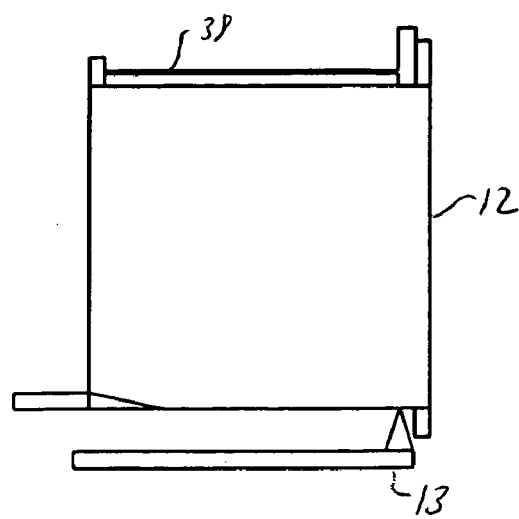
FIG. 13 is a schematic view illustrating how a slide-out, when extended, tends to tip down due to a gravity induced moment and how the cable of FIG. 12 is applied to resist such tipping.

As viewed in FIG. 12, the cable support system includes another cable 38 that runs from a first end 40 connected to an upper inside portion of the slide-out room 20 to an opposing end 42, which is connected to a lower outside portion of the room 20, to produce an opposite moment to counter a gravity-induced moment that results when the room 20 is retracted. The cable 38 exerts a force on the slide-out room 20 that is opposite to the direction that the slide-out room tends to rotate or tip when it is retracted, as shown in FIG. 13. Preferably, a cable 26 and a cable 38 is provided on each side of the slide-out room 20, for a total of four cables for the entire slide-out room 20. These cables are preferably arranged with two on each side and running in opposite directions. Therefore, the tipping of the room 20 is countered both when extending and retracting the slide-out room 20, and the room need not be supported by rails or other mechanisms as in many prior slide-out mechanisms.

In operation, the drive motor 42 is activated to drive the cog wheel 48, which in turn drives the cog track 44, and therefore the associated slide-out section, into and out of the recreational vehicle 10. The cog track 44 runs substantially along the length of the room, and provides a load bearing surface that is compressed between the slide-out room and the cog wheel 48. The cog wheel 48 bears a substantial portion of the weight of the room as it is slid into and out of the vehicle 10. Furthermore, as the room is moved into and out of the vehicle 10, the cables 38 described above prevent the room from tipping. The present invention, therefore, provides a relatively simple, lightweight, and reliable system for driving a room into and out of a recreational vehicle.

Figure 14:
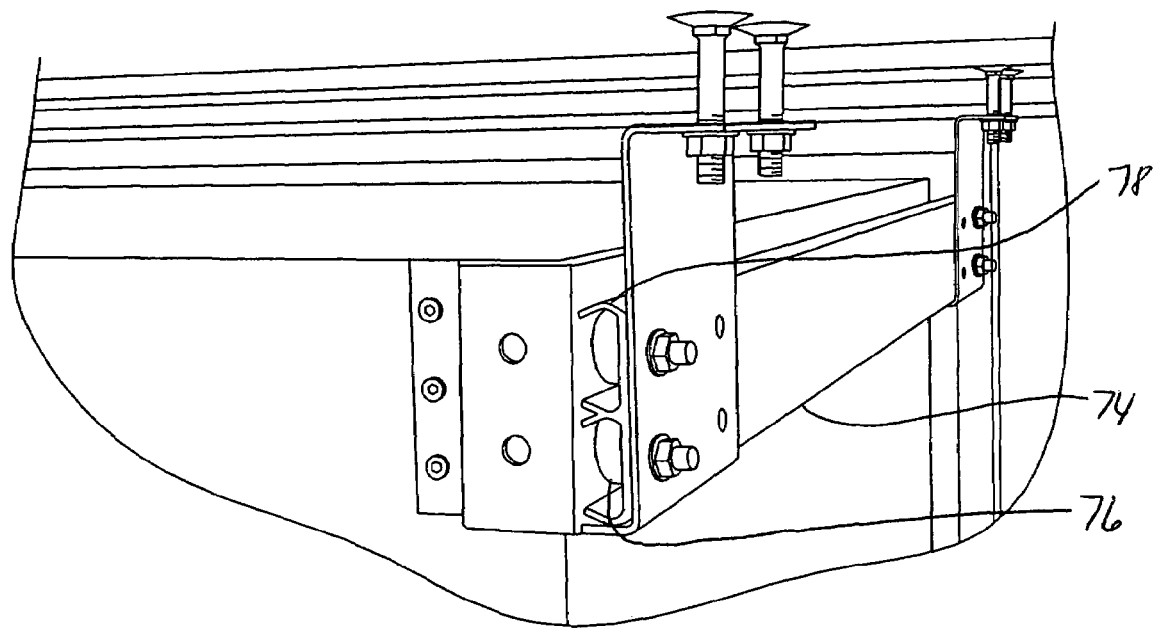
FIG. 14 illustrates a drawer from the inside of the vehicle to illustrate that a cog wheel system of the invention is exterior storage capable, i.e., it need not interfere with exterior drawers.

It should be apparent from the foregoing that a cog wheel drive system could also be applied to a slide-out drawer 72 (FIG. 1) as shown in FIG. 14, which may not necessarily have the cable systems that prevent tip-in and tip-out as previously described. To mount a sliding drawer, as shown in FIG. 14, there will typically be a rail 74 that supports the drawer 72 and rollers 76 that roll in a track 78 that keeps the drawer from tipping out. Since the drawer 72 does translate in and out, a cog wheel drive 40 (FIG. 4) and cog wheel track 44 (FIG. 6) could be easily accommodated to drive the drawer 72 in and out of the vehicle 10. Also, a cog wheel drive system of the invention adds minimal mechanism under the stationary floor 13 of the vehicle 10, so the cog wheel drive system does not interfere with storage drawers 72 that are accessible from the sides of the vehicle 10 and are provided below the slide-out rooms 16, 18, and 20. The log drive unit 40 can be applied in many other applications, including, for example, pivot-out rooms and other applications.

A preferred embodiment of the invention has been described in considerable detail. Many modifications and variations to the preferred embodiment described will be apparent, however, to a person of ordinary skill in the art. For example, although the drive system is described above in conjunction with a slide-out room, it will be apparent that the cog drive system can also be used in conjunction with pivot-out rooms, and with various other types of rooms and storage devices that can be extended from and retracted into a recreational vehicle. Therefore, the invention should not be limited to the embodiments described, but should be defined by the claims which follow.

I claim:

1. An expandable recreational vehicle comprising:
   a slide-out structure;
   a cog track having a base, side walls and teeth on the base between the sidewalls provided on a bottom surface of the slide-out structure;
   a cog wheel journalled to a bracket on which a drive motor that drives the cog wheel is also mounted, the cog wheel extending through a floor of the recreational vehicle and being provided in meshing engagement with the cog track, wherein the cog track is provided between and is compressed between the slide out structure and the cog wheel; and
   a cable having both ends affixed to the slide-out section and entrained about pulleys so as to exert a moment on the slide-out section that counteracts a gravity induced moment that tends to tip the slide-out section down.

2. The expandable recreational vehicle as claimed in claim 1, wherein the cog track is affixed at bottom edges of sidewalls of the slide-out section.

3. The expandable recreational vehicle as claimed in claim 1, wherein the motor comprises a shaft coupled to the cog wheel at a first end and to a second cog wheel for driving a second cog rack at the opposing end to synchronize motion of the cog wheel and the second cog wheel.

4. The expandable recreational vehicle as recited in claim 1, wherein a first end of the cable is affixed to an exterior wall of the slide-out section, and a second end of the cable is affixed to a portion of the slide-out section that is interior to the recreational vehicle.

5. The expanded recreational vehicle as recited in claim 1, wherein the cable is entrained over a first pulley and a second pulley, and wherein the cable extends along an interior side of one of the first and second pulleys and along the exterior side of the other of the first and second pulleys.

6. The expanded recreational vehicle as recited in claim 5, wherein one of the first and second pulleys is offset a distance above the other of the first and second pulleys.

7. The expanded recreational vehicle as recited in claim 1, wherein a first end of the cable is affixed to an exterior wall of the slide-out section, and a second end of the cable is affixed to a portion of the slide-out section that is interior to the recreational vehicle, and wherein the cable is entrained over a first pulley and a second pulley to extend along an interior side of one of the first and second pulleys and along an exterior side of the other of the first and second pulleys.

8. The expanded recreational vehicle as recited in claim 7, further comprising a second cable, the second cable being coupled at a first end to an inside portion of the slide-out section, and at a second end to an outside portion of the slide-out section, and wherein the second cable is entrained over a third pulley and a fourth pulley to extend along an interior side of one of the third and fourth pulleys and along an exterior side of the other of the third and fourth pulleys.

9. An expansion section for a recreational vehicle, comprising:
   a structure having a bottom surface and sized and dimensioned to be movable through an opening in a wall of the recreational vehicle;
   a cog track affixed to the bottom surface of the structure and having a base, side walls and teeth on the base between the sidewalls;
   a cog wheel extending through a notch in a floor of the recreational vehicle and having teeth in meshing engagement with the teeth in the cog track; and
   a motor having a shaft coupled to the cog wheel, wherein the motor is selectively activatable to drive the cog wheel to extend or retract the position of the structure and the cog track is compressed between the slide out structure and the cog wheel, and wherein the cog wheel is journalled to a bracket on which the motor is also mounted.

10. The expansion section as claimed in claim 9, further comprising a second cog track coupled to the bottom surface of the structure, and a second cog wheel having teeth in meshing engagement with the teeth in the second cog track.

11. The expansion section as claimed in claim 10, wherein the second cog wheel is coupled to the shaft to synchronize motion of the first and second cog wheels.

12. The expansion section as claimed in claim 9, wherein the structure further comprises at least one side wall, and the cog track is coupled to a bottom surface of the sidewall.

13. The expansion section as claimed in claim 9, wherein the cog track comprises a plurality of sections that are selectively coupled together.

14. The expansion section as claimed in claim 9, wherein the cog track further comprises a ramped section.

15. A recreational vehicle, comprising:
   a floor comprising a notch;
   an exterior wall defining an interior space and surrounding the floor and including at least one opening;
   a slide out section having a bottom surface and sized and dimensioned to move through the opening;
   a cog track including teeth coupled to and extending along at least a portion of the bottom surface;
   a cog wheel coupled adjacent the notch and extending through the notch in the recreational vehicle and having teeth in meshing engagement with the cog track; and
   a drive motor coupled to the cog wheel for driving the slide-out section between a stored position inside the recreational vehicle and an extended position extending through the opening in the recreational vehicle.

16. The recreational vehicle as recited in claim 15, further comprising a cable having both ends affixed to the slide-out section and entrained about pulleys so as to exert a moment on the slide-out section that counteracts a gravity induced moment that tends to tip the slide-out section down as it is extended from the opening.

17. The recreational vehicle as recited in claim 15, wherein an opening is provided in an exterior wall of the slide-out section, and the recreational vehicle further comprises a second slide-out section sized and dimensioned to be extended and retracted through the opening in the slide-out section.

18. The recreational vehicle as recited in claim 15, wherein the cog track in the slide out section includes a ramped section, the ramped section positioning the bottom surface of the slide-out section substantially parallel to the floor of the recreational vehicle when the slide-out section is extended.

19. The recreational vehicle as recited in claim 15, wherein the cog track is compressed between the slide out section and the cog wheel as the slide out section is extended and retracted.

20. The recreational vehicle as recited in claim 15 further comprising a cable having both ends affixed to the slide-out section and entrained about pulleys so as to exert a moment on the slide-out section that counteracts a gravity induced moment that tends to tip the slide-out section down as it is retracted into the opening.

21. The recreational vehicle as recited in claim 15, wherein the cog wheel is journalled to a bracket on which the drive motor is also mounted.

* * * * *

UNITED STATES PATENT AND TRADEMARK OFFICE
CERTIFICATE OF CORRECTION

| | |
|---|---|
| PATENT NO. | : 7,614,675 B2 |
| APPLICATION NO. | : 11/288607 |
| DATED | : November 10, 2009 |
| INVENTOR(S) | : James R. Kunz |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 578 days.

Signed and Sealed this

Nineteenth Day of October, 2010

David J. Kappos
*Director of the United States Patent and Trademark Office*